(12) United States Patent
Breton et al.

(10) Patent No.: US 11,111,989 B2
(45) Date of Patent: Sep. 7, 2021

(54) DEVICE FOR LEVEL ADJUSTMENT FOR A MOTOR VEHICLE

(71) Applicant: Schaeffler Technologies AG & Co. KG, Herzogenaurach (DE)

(72) Inventors: Wilfried Breton, Altdorf (DE); Christian Harkort, Erlangen (DE); Markus Holzberger, Emskirchen (DE); Sebastian Sommerkorn, Weisendorf (DE); Kilian Marsing, Hetzles (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 46 days.

(21) Appl. No.: 16/605,916

(22) PCT Filed: Feb. 22, 2018

(86) PCT No.: PCT/DE2018/100155
§ 371 (c)(1),
(2) Date: Oct. 17, 2019

(87) PCT Pub. No.: WO2018/196903
PCT Pub. Date: Nov. 1, 2018

(65) Prior Publication Data
US 2020/0049242 A1  Feb. 13, 2020

(30) Foreign Application Priority Data
Apr. 27, 2017 (DE) .................... 10 2017 109 046.0

(51) Int. Cl.
*F16H 25/22* (2006.01)
*F16C 19/18* (2006.01)
(Continued)

(52) U.S. Cl.
CPC ......... *F16H 25/2204* (2013.01); *F16C 19/18* (2013.01); *F16H 2025/2081* (2013.01); *F16H 2025/2445* (2013.01)

(58) Field of Classification Search
CPC ......... F16H 25/2204; F16H 2025/2081; F16H 2025/2445; F16C 19/18
See application file for complete search history.

(56) References Cited

U.S. PATENT DOCUMENTS 4,215,907 A * 8/1980 Pohl ........................ F16C 19/16
285/279
4,787,260 A * 11/1988 Bailey ..................... B23Q 5/408
74/89.36
(Continued)

FOREIGN PATENT DOCUMENTS

DE  10 2008 021 861 A1  11/2009
DE  10 2009 058 026 A1  6/2011
(Continued)

*Primary Examiner* — David M Fenstermacher
(74) *Attorney, Agent, or Firm* — Reid A. Baldwin

(57) ABSTRACT

A device for level adjustment for a motor vehicle includes a ball screw. The screw nut of the ball screw is driven by an electric motor. The spindle of the ball screw is displaceable with respect to a housing. The ball screw is supported with respect to the housing using two axial self-aligning bearings with a common pivot point such that the housing can pivot with respect to the spindle, thereby avoiding loads on the balls of the ball screw.

17 Claims, 2 Drawing Sheets

(51) Int. Cl.
  *F16H 25/20* (2006.01)
  *F16H 25/24* (2006.01)

(56) References Cited

U.S. PATENT DOCUMENTS

| | | | |
|---|---|---|---|
| 4,841,790 A | | 6/1989 | Williston et al. |
| 5,797,293 A | * | 8/1998 | Chaban ................ B60N 2/0232 |
| | | | 74/89.36 |
| 5,860,319 A | * | 1/1999 | Via ...................... B60N 2/0232 |
| | | | 248/429 |
| 5,943,919 A | * | 8/1999 | Babinski ................... B66F 3/08 |
| | | | 254/101 |
| 6,082,207 A | * | 7/2000 | Babinski ............. F16H 25/2204 |
| | | | 211/1.51 |
| 9,409,594 B2 | * | 8/2016 | Kimpian ............... F16C 25/083 |
| 9,822,813 B2 | * | 11/2017 | Niarfeix ................ F16C 23/082 |
| 2009/0230640 A1 | | 9/2009 | Michel |
| 2015/0183455 A1 | | 7/2015 | Wang |

FOREIGN PATENT DOCUMENTS

| | | |
|---|---|---|
| DE | 10 2011 075 972 A1 | 11/2012 |
| DE | 10 2014 206 142 A1 | 2/2015 |
| DE | 10 2013 222 648 A1 | 5/2015 |
| EP | 1 286 883 B1 | 3/2003 |
| JP | H1182497 A | 3/1999 |
| JP | 2004517279 A | 6/2004 |
| JP | 2004306728 A | 11/2004 |
| JP | 2008222218 A | 9/2008 |
| JP | 2008308312 A | 12/2008 |
| JP | 2011148340 A | 8/2011 |
| SU | 7340 A1 | 12/1928 |
| WO | 2008/125088 A2 | 10/2008 |
| WO | 2014/029390 A1 | 2/2014 |
| WO | 2015/129163 A1 | 9/2015 |
| WO | 2017016556 A1 | 2/2017 |

* cited by examiner

DEVICE FOR LEVEL ADJUSTMENT FOR A MOTOR VEHICLE

CROSS-REFERENCE TO RELATED APPLICATIONS

This application is the U.S. National Phase of PCT Appln. No. PCT/DE2018/100155 filed Feb. 22, 2018, which claims priority to DE 10 2017 109 046.0 filed Apr. 27, 2017, the entire disclosures of which are incorporated by reference herein.

TECHNICAL FIELD

The disclosure relates to a device for level adjustment of a motor vehicle, the device having a ball screw.

BACKGROUND

A device for level adjustment of a motor vehicle which operates with a ball screw is known, for example, from WO 2017/016556 A1. This device has a nut as well as a spindle which interacts with it via rolling bodies, into which spindle an adapter sleeve is inserted which axially supports the spindle. The adapter sleeve has a radially inwardly directed flange which is supported on a cylinder of a piston/cylinder unit. At least one elastic element is provided for acoustic uncoupling of the adapter sleeve from the cylinder.

A further device for height adjustment of a vehicle structure is disclosed in DE 10 2014 206 142 A1. This device comprises a movement thread, the thread parts of which can be bridged by a shiftable locking device in order to protect the active engagement between the threaded parts of the movement thread from high mechanical loads.

An active wheel suspension element which is known from DE 10 2013 222 648 A1, operates with a ball screw and serves to adjust a spring seat which supports a chassis spring has an additional compensation spring which is also supported on the spring seat.

A device known from DE 10 2009 058 026 A1 for height adjustment of a vehicle structure operates with an actuating means which comprises at least three linear guides which are arranged distributed evenly over a spring longitudinal axis and movement-coupled to one another via a force transmission means. In this case, the linear guides are formed to guide a support plate or spring plate.

A chassis actuator known from DE 10 2008 021 861 A1 comprises, in addition to a ball screw, a braking device which builds up a frictional torque which counteracts rotation of the nut or rotation of the spindle.

SUMMARY

A height adjustment device includes a ball screw which has a threaded spindle, a spindle nut, as well as rolling bodies which roll between the threaded spindle and the spindle nut. There is provided for driving the ball screw an electric motor which directly or indirectly, i.e. either in the sense of an electric direct drive or via a transmission, causes the spindle nut to rotate. As a result of the rotation of the spindle nut, a housing of the level adjustment device is displaced linearly with respect to the threaded spindle. Two axial self-aligning bearings are provided in the housing for bearing of the spindle nut. At least one of these axial self-aligning bearings is arranged in the flow of force between the threaded spindle and the housing. In a preferred installation situation, the threaded spindle is connected axially fixedly via an internal adapter sleeve to a damper or a vehicle structure, i.e. a car body and/or a frame, of a motor vehicle. The height adjustment can be realized in that the spindle nut with bearing, i.e. arrangement from two axial self-aligning bearings, and housing including a spring plate is axially moved.

In terms of the fundamental structure of axial self-aligning bearings, reference is made by way of example to documents WO 2008/125088 A2, WO 2014/029390 A1, EP 1 286 883 B1 and DE 10 2011 075 972 A1. Axial self-aligning bearings, for example, under the designations 29412-E and 29318-E are offered by the applicant.

Owing to the axial self-aligning bearings, the assembly which comprises the threaded spindle and the spindle nut is pivotable as a whole in relation to the housing. In this case, an entire assembly, which, in addition to the housing and the spring plate, also comprises a motor, in particular electric motor, and a transmission, can be pivotable as a whole with respect to the spindle nut.

A geometric pivot axis, which is not provided by the center axis of a shaft or another machine element, can in this case be oriented orthogonally to the center axis of the ball screw. Thanks to this pivotability, tensions within the level adjustment device are avoided during operation of the motor vehicle in all operating conditions. Tension-free pivotability can be achieved in that the two axial self-aligning bearings have a common pivot point about which the spindle nut and with it also the threaded spindle is pivotable relative to the housing. The avoidance of tensions between the threaded spindle and the spindle nut has a positive effect on the efficiency of the ball screw and the entire level adjustment device. The avoidance which is achieved with the aid of the axial self-aligning bearings of tilting torques which act on the spindle nut and could impair the service life of the level adjustment device is of particular importance.

As a result of the pivoting movement, i.e. pendulum movement, which any of the two axial self-aligning bearings enables, the housing-side bearing disk of the relevant axial self-aligning bearing is pivoted with respect to the associated shaft-side, i.e. spindle-side, bearing disk as seen in cross section in such a manner that an arc of a circle is described which lies in a plane in which the center axis of the ball screw also lies. Seen in spatial terms, the possible movements of the housing-side bearing disk describe a ball, the center point of which lies in the center axis of the threaded spindle.

The coincidence of the center points of the two circles described by the pivoting movements of the axial self-aligning bearings implies that the radii of these circles are not identical, i.e. the two axial self-aligning bearings differ from one another at least in terms of the geometry of their bearing disks. The geometry of the rolling bodies of both axial self-aligning bearings can, in contrast, be uniform.

The pivotability of the spindle nut together with the threaded spindle with respect to the housing is, in a preferred configuration, restricted by a plain bearing element which acts between the threaded spindle and the housing. The released pivot angle between the threaded spindle and the housing is preferably at least 1.2 degrees. No pivoting movement typically occurs during operation of the ball screw. On the contrary, the axial self-aligning bearing generally remains in a tension-free setting once it has been assumed. The stated pivot angle is preferably restricted to at most 5 degrees by stopping of the threaded spindle on the plain bearing element. It is advantageous to keep the pivot angle as small as possible as long as no tilting torques are introduced into the ball screw.

If weight forces are supported via the ball screw of the level adjustment device during operation of the motor vehicle, one of the two axial self-aligning bearings is primarily loaded by axial forces. If, however, the flow of force otherwise running through the ball screw is avoided by means of the blocking device, as is known in principle, for example, from DE 10 2014 206 142 A1, the spindle nut is in an at least approximately load-free state. In order to guide both axial self-aligning bearings in a defined manner in this state too, one of the axial self-aligning bearings is preferably acted upon with a force in the axial direction by means of a pretensioning element. A non-resilient adjustment disk could also be used instead of a pretensioning element.

The axial self-aligning bearings of the level adjustment device are preferably axial self-aligning bearings. Alternatively, axial self-aligning roller bearings can be used in the level adjustment device. In both cases, the axial self-aligning bearing can be formed either as a one-row or multiple-row self-aligning bearing. The device for level adjustment can also comprise the function of level regulation in addition to the pure adjustment function. The level adjustment device is suitable for cars and for utility vehicles.

BRIEF DESCRIPTION OF THE DRAWINGS

An exemplary embodiment is explained in greater detail below on the basis of a drawing. In the drawing.

DETAILED DESCRIPTION

Figure 1:
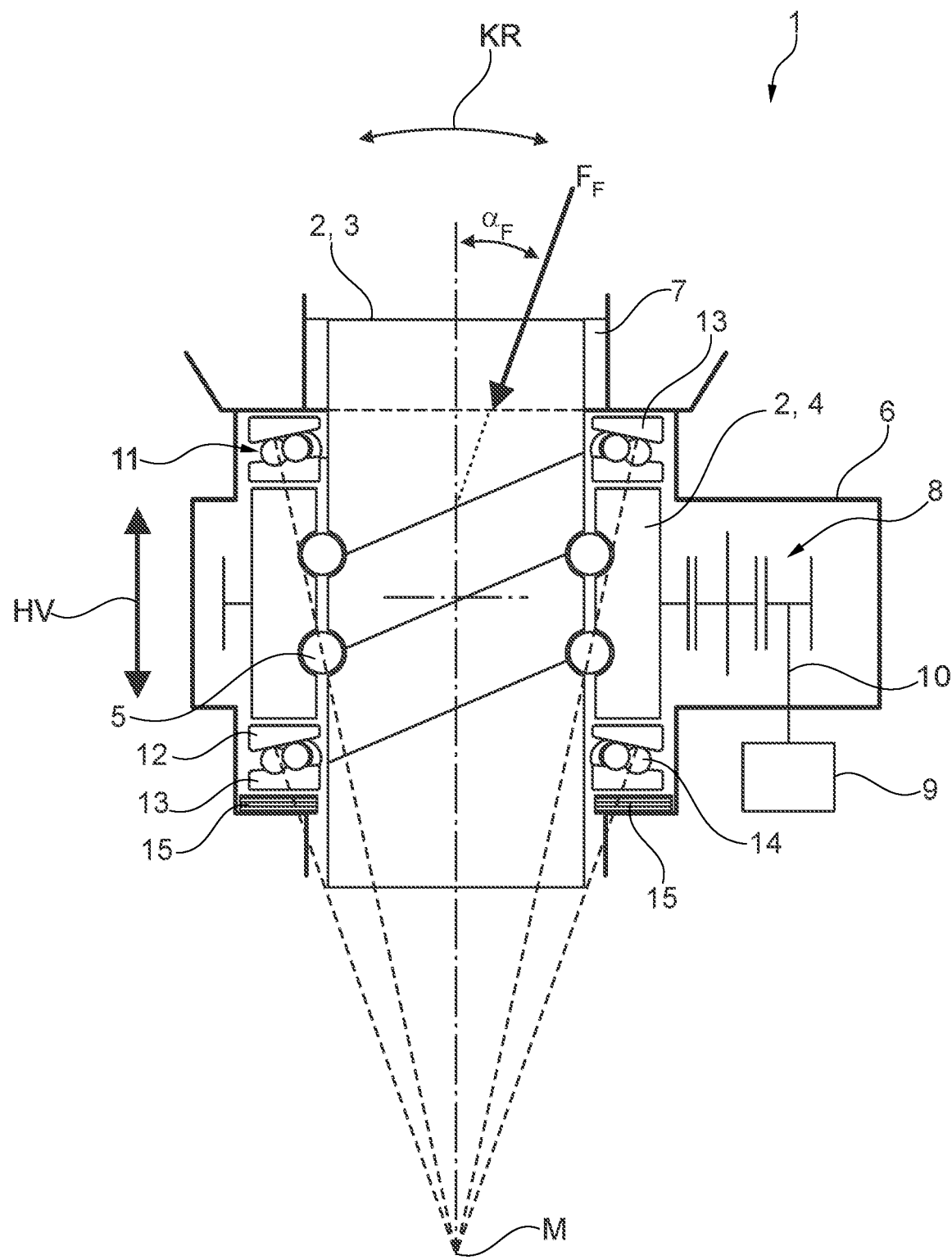
FIG. 1 shows a level adjustment device for a motor vehicle in a schematic sectional representation.
Figure 2:
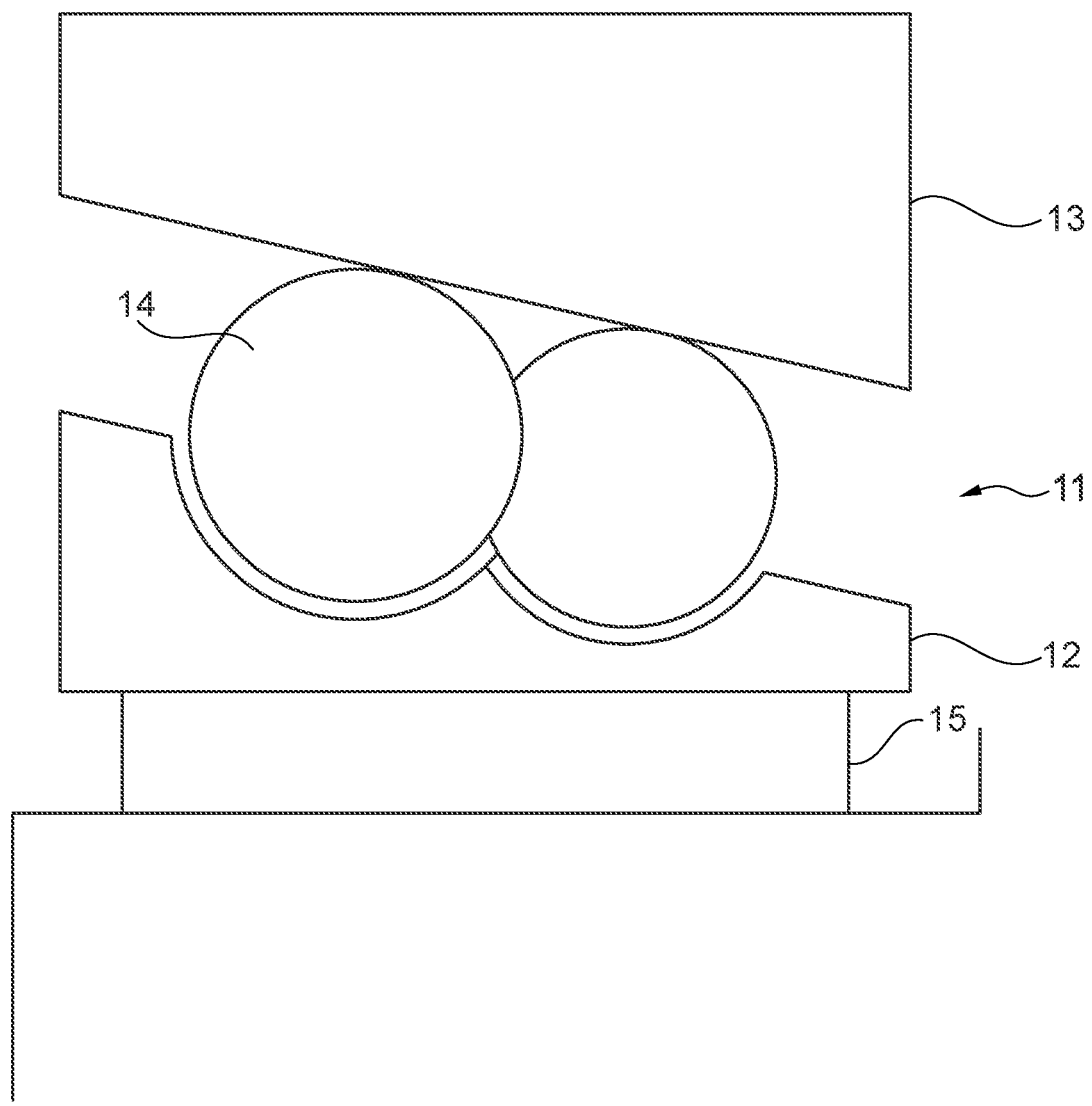
FIG. 2 shows an axial self-aligning bearing according to FIG. 1 in a roughly schematic representation.

A device for level adjustment for a motor vehicle designated in general by reference number 1, referred to in short as a level adjustment device, comprises a ball screw 2 with a threaded spindle 3 and a spindle nut 4, wherein balls run as rolling bodies 5 between threaded spindle 3 and spindle nut 4. Threaded spindle 3 is linearly displaceable within a housing 6 and is at the same time pivotable in relation to housing 6, wherein the pivoting of threaded spindle 3 with respect to housing 6 is restricted by a plain bearing element 7 which annularly surrounds threaded spindle 3. During operation of the motor vehicle, housing 6 is exposed to small, but not negligible pivoting movements about threaded spindle 3 which is connected to the vehicle structure.

Spindle nut 4 is rotatable in housing 6 and simultaneously mounted in an axially fixed manner, as explained in greater detail below. An electric motor 9, which, in the exemplary embodiment, is arranged outside housing 6, drives spindle nut 4 via a transmission 8, namely a step-down transmission in the form of a gear transmission which is arranged within housing 6. Instead of gear transmission 8, a transmission of another design, for example, a belt drive could also be used. The motor shaft which couples electric motor 9 to transmission 8 is designated by 10. Motor shaft 10 is omitted in alternative configurations in which threaded spindle 3 is directly electrically driven and the rotor of electric motor 9 is connected as an annular rotor directly to threaded spindle 3.

Two axial self-aligning bearings 11 which have in each case two bearings disks 12, 13 as well as balls 14 rolling between bearing disks 12, 13 are provided for mounting of spindle nut 4 in housing 6. Axial self-aligning bearings 11 are multi-row axial self-aligning ball bearings. Bearing disk 12 of each axial self-aligning bearing 11 is also referred to as a shaft-side bearing disk in short: shaft disk. Bearing disk 13 is the housing-side bearing disk, i.e. housing disk.

In the case of a height adjustment of the structure of the motor vehicle having level adjustment device 1, the level of housing 6 is adjusted, while threaded spindle 3 is stationary. A spring plate which is only represented in outline and is connected above housing 6 fixedly thereto supports a chassis spring, not represented, wherein the longitudinal axis of the chassis spring generally does not coincide with the center axis of ball screw 2.

A spring force $F_F$ is introduced into housing 6, wherein an angle $\alpha_F$ is enclosed between the longitudinal axis of threaded spindle 3, i.e. the center axis of ball screw 2, and the direction of force vector $F_F$. Said angle $\alpha_F$ is represented in an exaggerated manner in FIG. 1. Force $F_F$, in relation to the arrangement according to FIG. 1, acts on the upper of the two axial self-aligning bearings 11. In order to avoid this load in the case of a selected level adjustment of the chassis, a blocking device, not represented, exists, which has several adjustment levels and avoids the flow of force through rolling bodies 5. In this unloaded state of the two axial self-aligning bearings 11, a pretensioning force is generated by a pretensioning disk 15, generally referred to as a pretensioning element, which is arranged, relative to the arrangement according to FIG. 1, below lower axial self-aligning bearing 11, i.e. connected between its bearing disk 13 and housing 6. In this manner, rolling bodies 5 are always arranged in a play-free manner between bearing disks 12, 13 of axial self-aligning bearings 11.

Each axial self-aligning bearing 11 can be tilted about a geometric pivot axis which is oriented orthogonally to the center axis of ball screw 2. The tilting direction is designated in FIG. 1 by KR and indicated by a curved arrow which lies in the pivoting plane. Pivotability means that both bearing disks 12, 13 of each axial self-aligning bearing 11 are pivotable relative to one another, wherein the corresponding pivot axis is referred to as center point M or pivot point. Pivot points M of both axial self-aligning bearings 11 coincide, as is apparent from FIG. 1, which is enabled by a different design of axial self-aligning bearings 11 which is not apparent from FIG. 1. The pivoting of housing 6 in relation to threaded spindle 3, which is enabled by the two axial self-aligning bearings 11, is restricted by means of plain bearing element 7 to a pivot angle of no more than 5 degrees.

Within this pivoting range, the torque to be generated for actuation of ball screw 2 by electric motor 9 is independent of the orientation of threaded spindle 3 relative to housing 6. The function of a blocking device, not represented, with which discrete settings of level adjustment device 1 can be fixed while avoiding the flow of force running through running bodies 5, is independent of the pivotability of housing 6 produced by means of axial self-aligning bearings 11.

LIST OF REFERENCE NUMBERS

1 Level adjustment device
2 Ball screw
3 Threaded spindle
4 Spindle nut
5 Rolling body
6 Housing
7 Plain bearing element
8 Transmission
9 Electric motor
10 Motor shaft 11 Axial self-aligning bearing
12 Bearing disk
13 Bearing disk
14 Ball
15 Pretensioning element
$\alpha_F$ Angle
$F_F$ Spring force
HV Height adjustment
KR Tilting direction
M Center point, pivot point

The invention claimed is:

1. A device for level adjustment for a motor vehicle, comprising a ball screw with a threaded spindle and a spindle nut which interacts with the threaded spindle via rolling bodies and which is drivable by means of an electric motor and which is mounted by two axial self-aligning ball bearings with respect to a housing which is displaceable with respect to the threaded spindle.

2. The device as claimed in claim 1, wherein the two axial self-aligning ball bearings have a common pivot point around which the spindle nut is pivotable together with the threaded spindle relative to the housing.

3. The device as claimed in claim 2, wherein the pivoting of the spindle nut together with the threaded spindle with respect to the housing is restricted by a plain bearing element which acts between the threaded spindle and the housing.

4. The device as claimed in claim 3, wherein the plain bearing element permits a pivoting between the threaded spindle and the housing up to an angle of at least 1.2 degrees.

5. The device as claimed in claim 4, wherein the pivoting between the threaded spindle and the housing is restricted to an angle of at most 5 degrees.

6. The device as claimed in claim 1, further comprising a pretensioning element which acts on one of the two axial self-aligning ball bearings.

7. The device as claimed in claim 1, wherein the electric motor interacts via a transmission with the spindle nut.

8. The device as claimed in claim 7, wherein a gear transmission is provided as a transmission.

9. The device as claimed in claim 1, wherein the axial self-aligning ball bearings are formed as multi-row self-aligning bearings.

10. The device as claimed in claim 2, wherein the common pivot point is not axially between the two self-aligning ball bearings.

11. A device for level adjustment for a motor vehicle, comprising:
a housing;
a threaded spindle displaceable with respect to the housing; and
a spindle nut which interacts with the threaded spindle via rolling bodies, which is rotatable by means of an electric motor, and which is mounted relative to the housing by two axial self-aligning multi-row bearings, the two axial self-aligning multi-row bearings each having pivot points axially offset from the respective axial self-alignment multi-row bearing in a first axial direction.

12. The device as claimed in claim 11, wherein the pivot points of the two axial self-aligning multi-row bearings coincide with one another.

13. The device as claimed in claim 12, further comprising a plain bearing between the housing and the threaded spindle.

14. The device as claimed in claim 13, wherein the plain bearing element permits a pivoting between the threaded spindle and the housing up to an angle of at least 1.2 degrees and no more than 5 degrees.

15. The device as claimed in claim 11, further comprising a pretensioning element which acts on one of the two axial self-aligning multi-row bearings.

16. The device as claimed in claim 11, wherein the axial self-aligning multi-row bearings are ball bearings.

17. A device for level adjustment for a motor vehicle, comprising:
a housing;
a threaded spindle displaceable with respect to the housing;
a plain bearing between the housing and the threaded spindle; and
a spindle nut which interacts with the threaded spindle via rolling bodies, which is rotatable by means of an electric motor, and which is mounted relative to the housing by two axial self-aligning bearings, the two axial self-aligning bearings each having pivot points axially offset from the bearing in a first axial direction, wherein the pivot points of the two axial self-aligning bearings coincide with one another.

* * * * *